(12) United States Patent
Dheret et al.

(10) Patent No.: US 6,590,019 B2
(45) Date of Patent: Jul. 8, 2003

(54) AQUEOUS ADHESIVE COMPOSITIONS USEFUL AS BOTTLE LABELING ADHESIVES

(75) Inventors: Cecile Dheret, Abbots Langley (GB); Patrick J. Hayes, Caledon East (CA); Samantha J. Smith, Windsor (GB); Sarah L. Bladon, Burton on Trent (GB); John Harrington, Chester, NJ (US); Melissa Sardina, Piscataway, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/848,971

(22) Filed: May 4, 2001

(65) Prior Publication Data

US 2002/0151628 A1 Oct. 17, 2002

Related U.S. Application Data

(60) Provisional application No. 60/201,972, filed on May 5, 2000.

(51) Int. Cl.$^7$ .............................. C08K 5/09; C08L 3/02; B05D 5/10
(52) U.S. Cl. .......................... 524/272; 524/47; 524/270; 528/489; 106/145.1; 427/208
(58) Field of Search .............................. 524/25, 26, 47, 524/428, 272; 106/208.1, 145.1; 528/489; 427/208

(56) References Cited

U.S. PATENT DOCUMENTS

| | | | | | |
|---|---|---|---|---|---|
| 3,939,108 A | * | 2/1976 | Sirota et al. | ................ | 260/17.4 |
| 4,440,884 A | * | 4/1984 | Jannusch | ...................... | 524/26 |
| 4,964,939 A | * | 10/1990 | Gleason | ...................... | 156/336 |

* cited by examiner

*Primary Examiner*—Tae H. Yoon
(74) *Attorney, Agent, or Firm*—Cynthia L. Foulke

(57) ABSTRACT

An water based adhesive useful for bottle labeling applications. The adhesive contains styrene maleic anhydride and rosin, and provides a formulation with alkali sensitivity at moderate temperature together with cold water resistance.

18 Claims, No Drawings

AQUEOUS ADHESIVE COMPOSITIONS USEFUL AS BOTTLE LABELING ADHESIVES

This application claims benefit to the earlier filing date of provisional application No. 60/201,972, filed May 5, 2000.

FIELD OF THE INVENTION

This invention relates to aqueous adhesive formulations. More particularly, the invention relates to an aqueous bottle labeling adhesive that is formulated to provide an optimum balance of cold water resistance and label removability.

BACKGROUND OF THE INVENTION

Ice-proof or cold water resistant labeling adhesives have been used for many years for conditions where extreme humidity resistance and label removal are required, as for example in labeling beer and soda bottles, and some pharmaceuticals. Heretofore, most of these adhesives were based on casein in combination with metallic salts; however, the problems associated with caseins, e.g. cost, availability, variations in quality, etc., instigated searches for casein substitutes, especially those based on low cost, readily available starches.

While starch based adhesives are acceptable for some applications, these adhesives do pose a significant problem when used on returnable/reusable beverage bottles which must be cleaned prior to refilling. Typically bottlers use dilute hot caustic solutions to remove the labels, disinfect and clean the bottles; however, the labels bonded with the starch based adhesives which are formulated to give water resistance often resist removal under these conditions and separate steps must be taken to completely scrub off the labels and any residual adhesive.

The requirement for removability is countered by a requirement that the adhesive remain on the bottle during storage and use, a particularly difficult requirement when the bottles are cooled by immersion in ice water coolers. Thus, while adhesives based on starch and ammonium salts of styrene-maleic anhydride resins exhibit superior ice-proof properties, the bond formed by most of these adhesives is so strong that removal of the label, even upon soaking in hot alkaline water, is difficult or impossible under such conditions and equipment as are used in commercial operations.

Due to the recent ecological pressure which has reversed the trend toward "non-returnable" bottles and reemphasized the need for "returnables" which require removal of the labels prior to reutilization, the inability to remove the labels has made these recently developed adhesives unacceptable for commercial operations.

There is thus a need in the art for an ice-proof adhesive for labels which possesses the optimum balance in properties of being sufficiently cold water resistant to remain on the bottles during use yet may be easily removed or stripped from the bottles to facilitate reutilization.

SUMMARY OF THE INVENTION

It has now been found that ice-proof adhesives which possess an optimum balance of water resistance and label removability comprises:

a) water;
b) an effective amount of a water soluble adhesive polymer;
c) at least one styrene maleic anhydride copolymer having a styrene to maleic anhydride ratio of 1:1 to 3:1, said styrene maleic anhydride copolymer being present in an amount sufficient to provide 4.8 to 20 parts styrene maleic anhydride per 100 parts adhesive polymer;
d) 0.5 to 25% by weight of a rosin;
e) sufficient alkali to give a pH within the range of 7 to 11.

The resulting adhesive can form adhesive bonds between a large variety of bonded surfaces in many end uses. Further, the use of such formulations not only possess superior ice water resistance; they can significantly improve the aqueous cleanability of the adhesive materials from manufacturing equipment, application equipment, and end uses.

DETAILED DESCRIPTION OF THE INVENTION

As an adhesive base for the improved adhesives of the present invention can be either natural or synthetic and may include raw starches or converted or modified starches, or casein as well as conventionally employed synthetic polymers or mixtures thereof. When starches are used, they may be derived from any plant source including corn, potato, sweet potato, wheat, rice, sago, tapioca, waxy maize, sorghum, high amylose corn, etc. may be employed as may the corresponding conversion products as those dextrins prepared by the hydrolytic motion of acid and/or heat, the oxidized starches prepared by treatment with oxidants such as sodium hypochlorite, fluidity or thin boiling starches prepared by enzyme conversion or by mild acid hydrolysis or the corresponding ester or ether starch derivatives. The starches may be used singly or in combination to achieve various final properties in the adhesive composition. The preferred starches are amioca based since these starches, when cooked, have a higher resistance toward pasting up on aging. Raw cornstarch or other starch derivatives may additionally be blended into the mixture for the desired rheological or machining properties.

Suitable synthetic polymers include polyvinyl pyrrolidone, polyacrylic acid derivatives, polyvinyl alcohol, ethylene vinyl acetate polymers and derivatives thereof such as carboxylated or surfactant stabilized ethylene vinyl acetate, vinyl acetate polymers and copolymers such as copolymers of vinyl acetate and butyl acrylate, ethyl hexyl acrylate or dioctyl maleate, polyvinyl acrylate homopolymers, acrylic polymers, styrene butadiene polymers, polyurethanes, neoprene and styrene acrylic polymers.

The adhesive composition generally comprises 20 to 80% by weight of the base polymer, preferably about 25 to 40% by weight.

The term "styrene-maleic anhydride resin" as used herein is also meant to include the corresponding acid functionalities as well as the preformed salts of the resins. In general, the styrene-maleic anhydride copolymers will vary in molar ratio of styrene to maleic anhydride from 1:1 to 3:1. They may vary in molecular weight from 1,600 to 50,000 and may include the respective half ester modifications with alcohols.

The styrene and maleic anhydride can be polymerized to form resins for use in this invention by any conventional polymerization methods. Solution polymerization methods can be employed where the monomers are polymerized in a suitable solvent using as a polymerization catalyst a free-radical catalyst, such as benzoyl peroxide or dicumyl peroxide, at a temperature of about 750 to 300° C. or more. Suitable solvents include the aromatic hydrocarbons such as cumene, p-cymene, xylene, toluene and the like.

The partial esters of these styrene-maleic anhydride resins can be prepared for use in this invention in conventional manners from alkanols of about 3 to 20 carbon atoms, preferably from hexanol or octanol. The extent of the half-esterification of the styrene-maleic anhydride copolymer will generally be about 10 to 100%, preferably 20 to 80%. That is, about 5 to 50%, preferably 20 to 40% of the total number of carboxyl groups of the copolymer are esterified with alcohol. The esterification can be effected by simply heating a mixture of the appropriate quantities of sytrene-maleic anhydride copolymer with the alcohol at elevated temperatures, usually about 100° to 200° C. Preparations of these esters are described in U.S. Pat. Nos. 3,342,787 and 3,392,155.

Among the preferred resins employed in this invention are the styrene-maleic anhydride (SMA) copolymers having a styrene to maleic anhydride ratio of 3:1 and a molecular weight of 1900 and sold under the name SMA 3000A by Arco. A half ester, sold by Arco as SMA 2625A, having a styrene to maleic anhydride ratio of about 2:1, a molecular weight of 1900 and comprising a 50% hexyl half ester modification is also preferred. Another preferred resin has a styrene to maleic anhydride ratio of 1:1, a molecular weight of 50,000 and is available from Monsanto under the tradename Lytron 810.

Also useful herein is the half ester, Scripset 550 from Monsanto, which is available in a powdery form, has a softening temperature of 175–180° C. and an acid number of approximately 175. Also useful are Scripset 700 (acid number 95) and Scripset 720 (acid number 270) from Monsanto as well as SMA 2000 (acid number 350) and SMA 3000 (acid number 280) from Elf Ato Chem.

The ratio of the styrene maleic anhydride to starch will generally vary between about 4 and 40 parts styrene maleic anhydride per 100 parts base polymer.

The rosins utilized herein includes wood rosins and hydrocarbon rosins. Rosin and wood rosin materials naturally occur in the olioresin of pine trees. Rosin is typically obtained from exudates of living pine trees, aged stumps and as a byproduct of kraft paper industry. Rosins and wood rosins are a complex mixture of mainly naturally occurring resin acids and fatty acids in varying proportions. The materials are typically pale yellow to dark red to nearly black with a red tint. Wood rosins are soluble in most organic solvents but are insoluble in water. Rosin can be obtained as an unmodified rosin directly from a natural source or can be hydrogenated, dehydrogenated, polymerized, derivatized or other modification. Wood rosins useful in the invention are typically solid or nearly solid at room temperature. An important property of the wood rosin material is that it preferably forms a melt at boiling water temperatures. Accordingly, such rosins will have a melting point up to and including 110.° C. Other wood rosins can be used with higher melting points if pressurized reactors are available to increase the boiling point of the aqueous solutions into which the rosin is incorporated.

Hydrocarbon resins are thermoplastic polymers of low molecular weight derived from coal or petroleum sources and from turpentine. The average molecular weights of these resins fall below 2,500 and typically below 2,000. Such hydrocarbon resins typically have softening points between 900 and 140° C. and often come in the form of a flake or solid product.

Preferred rosins include wood rosin, tall oil rosin, gum rosin and mixtures thereof. Additional information with respect to hydrocarbon resins, rosin and rosin derivatives can be found in the Kirk-Othmer Encyclopedia of Chemical Technology, 2nd Edition, Vol. 11, pp. 242–262, and Vol. 17, pp. 475–508. If acid rosins are used, it is preferred that they have an acid number of less than 140, most preferably less than 130, as determined by A.S.T.M. D-465. The rosin is generally used in an amount of 0.5 to 25%, preferably 1–10%, most preferably 1–3% by weight.

Bases that can be used in the instant invention to assist in the dissolution of the SMA component can be drawn from two general classes. Each of the classes have special and unique properties that are obtained from the interaction between the base, the rosin and the adhesive composition. While a fixed or permanent alkali can also be used to dissolve the SMA, if used alone it will only give caustic washability and not ice water resistance. If ice water resistance is desired, it must be blended with a volatile base.

A first class of base comprises an alkali metal base or alkaline earth metal base which in aqueous solution can neutralize the acidic moiety in an acidic rosin composition. Such basic compositions include bases derived from alkali metals and alkaline earth metals such as sodium, potassium, magnesium, calcium, and other basic metal compounds. Exemplary compounds include sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, sodium pyrophosphate, and others. Typical properties for the alkali metal and alkaline earth metal bases of this invention involve at least some water solubility, a pH greater than 7 in a water solutions of the base, and sufficient reactivity to neutralize the acidic rosins of the invention. Such bases when used to neutralize the acidic rosins of the invention provide starch based adhesives that are readily dissolved in neutral, acidic or basic aqueous cleaners.

A second class of bases useful in preparing the adhesives of this invention include volatile nitrogen bases. Such bases include basically reacting compounds, preferably from nitrogen, that can be volatilized through the action of heat or upon exposure to ambient atmosphere. Such bases include ammonia, ammonium hydroxide, methylamine, dimethylamine, triethylamine, ethylamine, diethylamine, triethylamine, ethanolamine, dimethylethanolamine, diethanolamine, triethanolamine, morpholine, and others having a boiling point up to and including about 150° F. Preferred volatile nitrogen bases for use in this invention comprise compositions having a vapor pressure at room temperature such that the amine evaporates from the glue line at a rate greater than that of water. Such compounds as they evaporate from the glue line leave the adhesive bond particularly susceptible to aqueous removability. Most preferred base for use in this invention includes ammonia and ammonium hydroxide for reasons of rapid reaction, low cost and ease of volatilization. The use of such volatile amines provides an adhesive that when cured can be resistant to the effects of neutral aqueous solutions but can be rapidly removable in the presence of dilute alkali.

For improved ice water resistance, it is also desirable to use a portion of the alkali in the form of a fixed alkali, that is any alkali which does not volatilize off during drying and therefore does not cause the styrene maleic anhydride salt to revert to an insoluble form on aging. Suitable fixed alkali include sodium potassium, lithium hydroxides and the organic amines such as the mono-, di- or tri-ethanolamines or the isopropanolamines.

It is also desirable to utilize a peptizer, such as urea, formamide, ammonium thiocyanate, acetamide, thiourea and dicyandiamide or mixtures thereof, to prevent instability or pasting up of the finished products on aging. If present, the peptizer is utilized in amount of about 5 to 20% by weight, preferably about 10% by weight.

Defoamers, preservatives, humectants, clay, masking agents, color agents and other modifying agents may be added without affecting the desirable properties of the adhesives of the invention. Thus, modifying agents such as wheat flour, bentonite, etc. may be employed for additional shortness and for machining requirements. Defoamers including tributyl phosphate, preservatives such as phenol, color agents like caramel and plasticizers and hygroscopic agents such as glycols, glycerine, fatty acids, etc. may also be employed as required.

Water is the aqueous solvent preferably employed for forming the liquid adhesive, however other aqueous media may be employed to dissolve the various ingredients, including for example, mixtures of organic solvents and water. The amount of solvent employed in preparing these compositions will vary depending upon the properties such as viscosity, etc. desired in the final product and may easily be determined by the practitioner.

The adhesive compositions of this invention are typically made by combining water, the SMA, and defoamer and mixing for about 10 minutes to disperse the SMA. Peptizers such as urea and dicyadiamide (DICY) are then added and mixed after which the fixed amine base is added if utilized. The base polymer, such as the starch, is then added and mixed until fully dispersed after which the volatile nitrogen base is added to raise the pH and dissolve the SMA. The mixture is cooked at 200° F. for 15 minutes and then cooled to about 125° F. at which point the rosin is added with any remaining ingredients such as additional synthetic polymers, preservatives, masking agents, etc., The viscosity of the final product varies with the adhesive base, the type of label, the labeling machine, its speed and the environmental conditions. Thus, viscosities can range from 10,000 cps to 150,000 cps at 72° F. (22° C.), however they will generally be within the range of 20,000 cps and 60,000 cps.

Virtually any commonly available label can be used with the adhesive compositions of the invention. Labels typically are prepared from thin sheet-like materials and can be made from a variety of materials including paper, polymer films, foil, metallized films, film to polyester sheets, woven and nonwoven fabrics, and other sheet-like materials. Preferably labels formed of paper, polymer films or metallized polymers are used.

EXAMPLES

In the examples which follow and in evaluating the products produced in accordance with the present invention, the following tests were employed to evaluate the degree of ice-proofness and the removability of the labels.

Ice Water Resistance

Approximately 1 mil of the adhesive is coated onto the backside of a label. This is done using a wire wound bar and a draw down machine. The label is hand placed on the reusable bottle and compressed moderately. Steps 1 and 2 are repeated with the control adhesive (casein based adhesive in this case). The labeled bottle is allowed to dry for 3 days at room temperature. Bottles are placed in 40° F. water and stored at 40° F. for 3 weeks. Periodically the bottle is twisted by the neck to test flagging. It is also lifted out of the water to check for label swimming.

Caustic Removability

Bottles are labeled as described above in steps 1–3. Labeled bottles are allowed to dry between 1 week and 1 month. Bottle is submerged in 3% KOH (potassium hydroxide) solution at 160° F. Bottle is rotated mechanically until the labels falls off. Bottle is removed from the caustic solution and evaluated for residue.

A test adhesive is considered successful if the time required for removal is similar or less than that of the casein adhesive.

Example 1

Two sets of adhesives were prepared using the components shown in Table 1.

TABLE 1

| Raw Material | % in Formula |
| --- | --- |
| Water | 43.1 |
| SMA | 3.0 |
| Peptizer | 10.0 |
| Concentrated Ammonium Hydroxide | 3.50 |
| Defoamer | 0.20 |
| Preservative | 0.20 |
| Rosin | 2.5 |
| Starch blend | 33.5 |
| Sorbitol | 3.0 |
| Clay | 1.0 |
| Water | 39.60 |
| SMA | 7.00 |
| Peptizer | 11.0 |
| Concentrated Ammonium Hydroxide | 4.20 |
| Defoamer | 0.40 |

TABLE 1-continued

| Raw Material | % in Formula |
|---|---|
| Preservative | 0.10 |
| Rosin | 2.50 |
| Starch | 23.50 |
| Acrylic Emulsion | 11.00 |
| Triethanolamine | 0.50 |
| Masking Agent | 0.20 |

The samples possessed excellent ice proof yet were readily removed by caustic.

The samples possessed excellent ice proof resistance (in excess of three weeks) yet were readily removed by caustic.

Example 2

An additional series of formulations were prepared using a variety of different rosins. In these formulations, the following "base" adhesive formulation was utilized:

| Water | | 35.6% |
|---|---|---|
| SMA | | 7.0% |
| Defoamer | | 0.20% |
| | Mix for 10 minutes | |
| Triethanolamine | | 0.50% |
| Peptizer | | 11.4% |
| Defoamer | | 0.20% |
| | Mix 10 minutes | |
| Starch | | 23.4% |
| Water | | 0.5% |
| Concentrated | | 4.2% |
| | Mix 15 minutes. | |
| | Heat to 200° F. and hold for 15 minutes. | |
| | Cool to 125° F. and add: | |
| Water | | 3.4% |
| Acrylic emulsion | | 11.0% |
| Preservative | | 0.10% |
| Rosin (see Table 2 and 3) | | 2.5% |
| | Mix for 30 minutes | |

2.5% of the rosins shown in Table 2 were added to the adhesive described above. Caustic wash time was comparable to control samples

TABLE 2

| Rosin Type | Acid Number (° C.) | Softening Point (° C.) | Caustic Wash Time |
|---|---|---|---|
| Aquatac 5527 | 0 | 27 | 1:49 / 2:50 |
| Snowtack 880G | 10 | 85 | 1:56 / 2:52 |
| Snowtack 790G | 12 | 88 | 2:59 / 3:03 |
| Snowtack SE324G | 15 | 31 | 2:29 / 1:48 |
| Unitac-XL-10 (Union Camp) | 15 | 25 | 2:31 / 1:22 |
| DRS-40 (Arizona) | 15–17 | NA | 2:37 / 1:59 |
| Sylvatac DR75E | 120 | 74 | 2:19 / 1:51 |
| Snowtack 375F | 137 | 78 | 3:26 / 1:39 |

TABLE 2-continued

| Rosin Type | Acid Number (° C.) | Softening Point (° C.) | Caustic Wash Time |
|---|---|---|---|
| Control #1 (casein adhesive) | | | 2:36 / 3:11 |
| Control #2 (non-casein adhesive with 0% rosin) | | | 5:43 / 8:52 |

2.5% of the rosins shown in Table 3 were added to the adhesive described above and compared to a new set of control samples.

TABLE 3

| Rosin Type | Acid Number (° C.) | Softening Point (° C.) | Caustic Wash Time |
|---|---|---|---|
| Aquatac 6085 | 22 | 82 | 2:56 / 5:54 |
| Rondis DRS-570 (Eka Chemical) | 12 | NA | 3:15 / 2:54 |
| Burez K80-50D (Eka Chemical) | 12 | NA | 4:12 / 4:42 |
| Aquatac 6025 | 22 | 26 | 3:47 / 3:52 |
| Snowtak 301A | 145 | 64 | 2:40 / 3:56 |
| Snowtack 301F | 145 | 71 | 2:41 / 3:48 |
| Control #1 (casein adhesive) | | | 3:07 / 3:31 |
| Control #2 (non-casein adhesive with 0% rosin) | | | 7:19 / 9:12 |

In addition to the caustic removability as noted above, the formulations also exhibited superior ice proof properties.

Example 3

The performance properties of the adhesive are also affected by the type of base added. Three formulations (A,B, and C) were prepared as described in Example 2 using Arizona DRS-40 as the rosin (see Table 4). One sample contained sodium hydroxide, one contained ammonium hydroxide and the third a blend of the two bases. All had improved caustic washability as compared to the starch sample without rosin and comparable washability to the casein sample. The sample that contained ammonium hydroxide alone or as a blend had improved ice water resistance compared with the sample which contained only sodium hydroxide.

TABLE 4

| Product | Type of Base | Caustic Wash Time | Ice Water Resistance |
|---|---|---|---|
| Casein Adhesive | NH₄OH | 2:36 & 3:11 | Three Weeks at 40° F. |
| Non-casein Adhesive | NH₄OH | 5:43 & 8:52 | Three Weeks at 40° F. |
| A | NH₄OH | 1:59 & 2:37 | Three Weeks at 40° F. |
| B | NaOH | 1:34 & 2:45 | none |
| C | NH₄OH + NaOH | 2:57 & 3:04 | Three Weeks at 40° F. |

What is claimed is:

1. An adhesive composition comprising water, 20 to 80% by weight of a water soluble adhesive polymer, an amount of at least one styrene maleic anhydride copolymer sufficient to provide 4.8 to 20 parts styrene maleic anhydride per 100 parts adhesive polymer, 0.5 to 25% by weight of a rosin, and sufficient base to give a pH within the range of 7 to 11, wherein when said rosin is an acid rosin, said acid rosin has an acid number of less than 140.

2. The adhesive of claim 1 wherein the styrene maleic anhydride copolymer has a styrene to maleic anhydride ratio of 1:1 to 3:1.

3. The adhesive of claim 1 wherein the adhesive polymer is a natural polymer.

4. The adhesive of claim 3 wherein the adhesive polymer comprises starch.

5. The adhesive of claim 3 wherein the adhesive polymer is a synthetic polymer.

6. The adhesive of claim 5 wherein the adhesive polymer comprises a polymer selected from the group consisting of polyvinyl pyrrolidone, polyacrylic acid, polyvinyl alcohol, ethylene vinyl acetate polymers and, vinyl acetate polymers and copolymers, polyvinyl acrylate homopolymers, acrylic polymers, styrene butadiene polymers, polyurethanes, neoprene and styrene acrylic polymers.

7. The adhesive of claim 1 wherein the base comprises ammonium hydroxide.

8. The adhesive of claim 7 wherein the base further comprises sodium hydroxide.

9. The adhesive of claim 1 wherein the base comprises a volatilized nitrogen base.

10. The adhesive of claim 1 further comprising a peptizer.

11. A labeled bottle comprising the adhesive of claim 1.

12. The bottle of claim 11 wherein the label is formed of a material selected from the group consisting of paper, polymer films, foil, metallized films, film to polyester sheets, woven fabrics and nonwoven fabrics.

13. The bottle of claim 12 wherein the label is formed of paper, a polymer film or a metallized polymer.

14. A method of applying a label to a container comprising applying the adhesive of claim 1 to a label, applying the label to a container, and drying the adhesive.

15. The method of claim 14 wherein the container is a bottle.

16. The method of claim 15 wherein the label is formed of paper, a polymer film or a metallized polymer.

17. A process of removing a label from the labeled bottle of claim 11 comprising submerging the labeled bottle in a caustic solution for a time sufficient to remove the label from the labeled bottle.

18. The process of claim 17 wherein the caustic solution comprises a 3% potassium hydroxide solution.

* * * * *